Dec. 5, 1939.　　　　H. A. FABER　　　　2,182,471
ROTOR UNIT FOR SPRAYING LIQUIDS
Filed Oct. 8, 1936　　　2 Sheets-Sheet 1
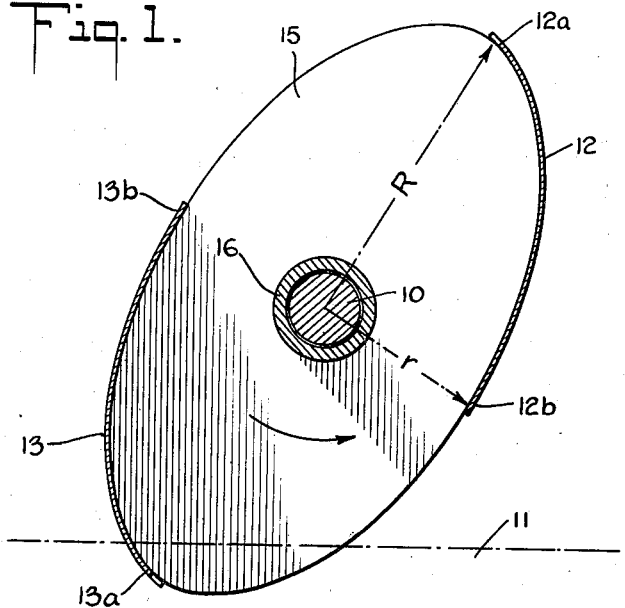
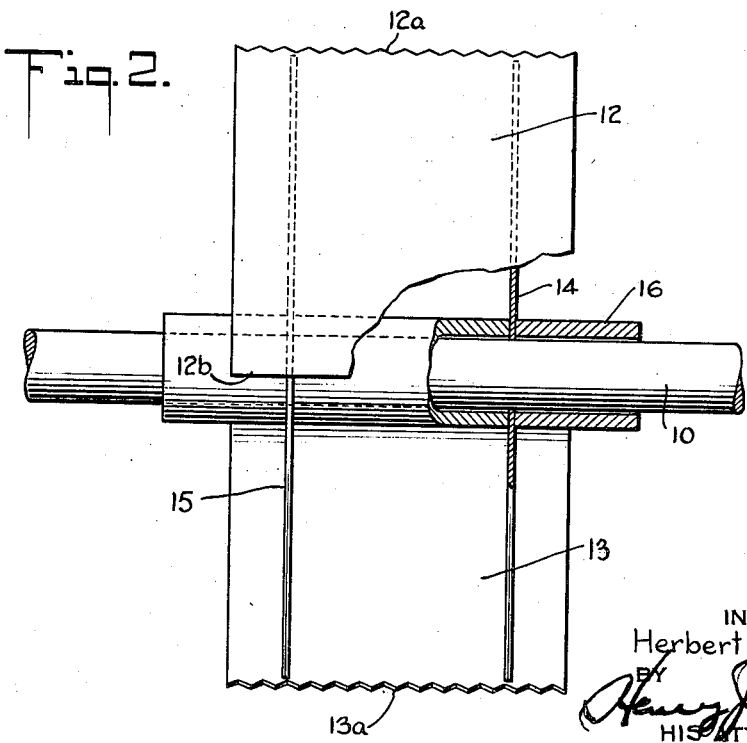
INVENTOR
Herbert A. Faber
HIS ATTORNEY Dec. 5, 1939. H. A. FABER 2,182,471
ROTOR UNIT FOR SPRAYING LIQUIDS
Filed Oct. 8, 1936 2 Sheets-Sheet 2
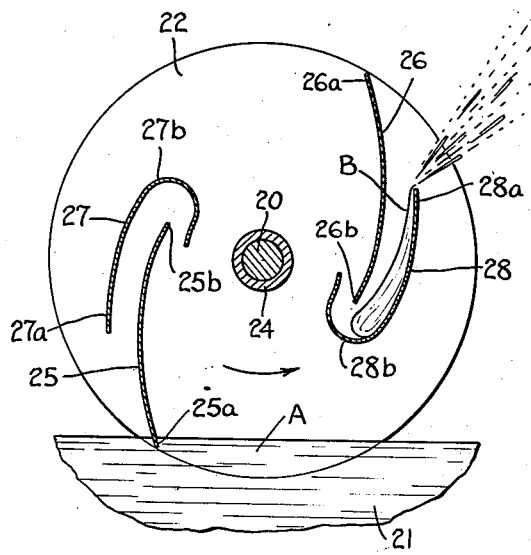
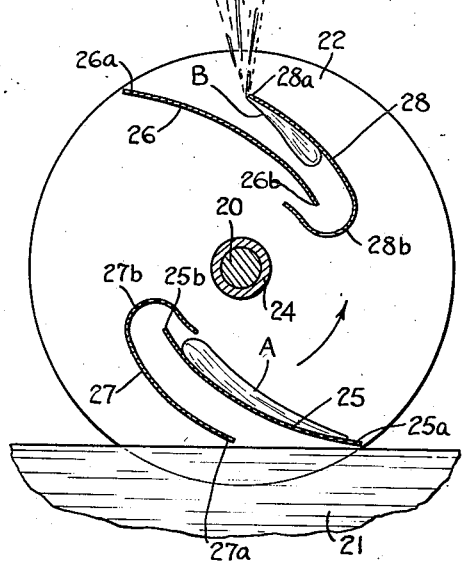
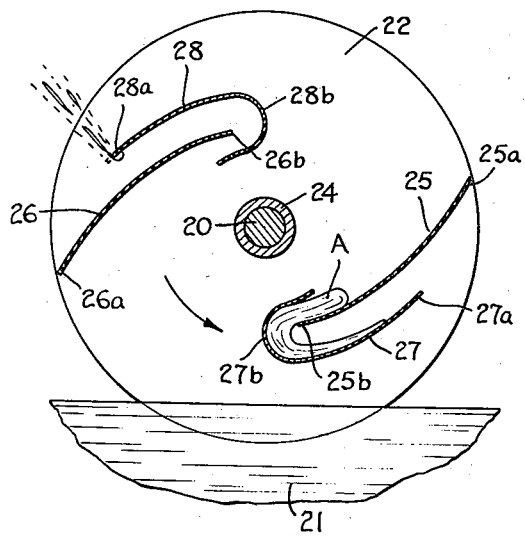
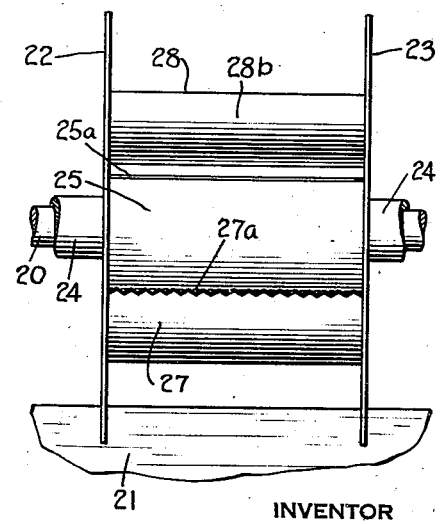
INVENTOR
Herbert A. Faber
HIS ATTORNEY Patented Dec. 5, 1939

2,182,471

UNITED STATES PATENT OFFICE 2,182,471

ROTOR UNIT FOR SPRAYING LIQUIDS

Herbert Alfred Faber, Cincinnati, Ohio

Application October 8, 1936, Serial No. 104,583

13 Claims. (Cl. 299—63)

This invention relates to a rotor-unit which functions in cooperative relation with a maintained body of liquid for converting successive quantities of the liquid into spray.

Rotor-units, according to the present invention, are designed to produce a fine spray of liquid, to direct that spray throughout a desired predetermined zone, to accomplish a thorough dissemination of liquid droplets throughout the predetermined zone, to use and re-use the same liquid indefinitely without impairment of operation by foreign matter suspended therein, and to operate with a minimum of power consumption.

Embodiments of the invention are particularly applicable to the spraying of cleansing liquids in various types of washing machines, as for instance, laundry machines, gas washers, and dish washers.

The rotor-unit is rigidly secured, either singly or in combination with other like rotor-units, to a shaft for rotation therewith. The shaft is mounted adjacent a maintained body of cleansing liquid in such manner that appropriate portions of the rotor-unit will dip below the surface of the liquid, pick up a quantity of same during rotation, and discharge that quantity in the form of a fine spray during a portion of each revolution.

Embodiments of the rotor-unit includes a suitable supporting frame adapted to rotate about an axis, suitably positioned with respect to the maintained body of cleansing liquids. The rotor-unit may include shaft means as an integral part thereof, or it may provide for reception of independent shaft means. At least one scoop member is rigidly mounted on the frame for rotation about the axis.

The scoop member comprises preferably a plate disposed partially around, and so mounted with respect to, the axis of rotation that its leading edge, when the unit rotates, is a considerably greater radial distance from the axis than is the radial distance of its trailing edge from the same axis. Both the leading edge and the trailing edge of the scoop member, as well as the inner surface thereof, are open-spaced from the axis of rotation to provide an open passage between the scoop member and the axis of rotation.

Advantageously, the scoop member is disposed with respect to its axis of rotation in substantially the manner that a quarter-segment of an ellipse is disposed with respect to the center of the ellipse. It has, desirably, curvature substantially similar to that of a quarter-segment of an ellipse.

In a preferred form of the present invention, two scoop members are mounted in diagonal opposition about the axis of rotation. They are held rigid relative to each other and to the axis by means of side plates secured to their respective lateral edges.

As the rotor-unit rotates in cooperative relation with the maintained body of cleansing liquid, each scoop member dips below the surface of the liquid and picks up a quantity of same at the lower portion of each revolution. Because of inertia, the quantity of liquid moves upwardly with less velocity than does the scoop member, and accordingly travels along the curved inner surface of the scoop member toward the trailing edge thereof. Before it reaches the trailing edge, however, centrifugal force acting thereon effects reversal of direction of its travel by reason of the differential in radial distances from the axis, of the leading edge and of the trailing edge. The quantity of liquid then moves rapidly toward the leading edge of the scoop member in the direction of rotation of the rotor-unit, and is forcibly discharged substantially radially of the axis of rotation.

The same principle of operation is involved in complex embodiments of the invention wherein the quantity of liquid is discharged from a blade surface independent of the surface of the pick-up blade. In such cases, the main blade is shortened to allow passage of the quantity of liquid over its trailing edge to an auxiliary blade surface before centrifugal force effects reversal of the direction of liquid travel. Discharge of the liquid from the rotor-unit in the form of spray then occurs from the leading edge of the auxiliary blade surface.

In all forms of the apparatus, however, the lengths of the individual scoop members, their configuration, and their disposition with respect to the axis of rotation will be such that, for given depths of bite into a maintained body of liquid and at given speeds of rotation of the rotor-units, the quantities of liquid scooped up will have their directions of travel reversed and will discharge from the leading portions of the scoop members.

By reason of the open passage between the scoop member and its axis of rotation, entrainment of air within the scoop member is precluded, and eddy currents, which would be disturbing to the flow of the liquid along the inner surface of the scoop member, have no chance to form. Also, tendency for the rotor-unit to function as a fan for the surrounding air will be almost entirely eliminated, thus protecting the surface of the maintained body of liquid from undue disturbance.

In the drawings,

Fig. 1 represents a vertical section, taken normal to the axis of rotation, of a preferred embodiment of rotor-unit;

Fig. 2 illustrates the rotor-unit of Fig. 1 in front elevation. A portion of the device is broken away to reveal internal structure.

Fig. 3 represents a vertical section, taken normal to the axis of rotation, of another embodiment of rotor-unit. Two phases of the operation of the scoop members are represented;

Fig. 4 is a view corresponding to that of Fig. 3, but disclosing subsequent stages of operations of the scoop members;

Fig. 5 is a view corresponding to that of Figs. 3 and 4, but disclosing a still later stage of operation of the scoop members;

Fig. 6 illustrates a front elevation of the rotor unit of Figs. 3, 4 and 5, disposed as in Fig. 5.

Referring to the drawings, and particularly to Figures 1 and 2 thereof, a preferred embodiment of rotor-unit is illustrated mounted for rotation on a shaft 10, and properly disposed with respect to a maintained body of liquid, indicated at 11. The shaft 10 is positioned for rotation in substantially a horizontal plane in suitable disposition above the body of liquid 11.

The rotor-unit of the present preferred embodiment comprises two scoop members 12 and 13 rigidly mounted with respect to the axis of rotation, represented by the shaft 10, on mutually diagonally opposed sections of end plates 14 and 15, and preferably adjacent or at the periphery thereof. The scoop members 12 and 13 have their inner, i. e., scoop, surfaces facing the shaft 10 and wholly spaced apart therefrom.

Each scoop member comprises a plate, preferably of sheet metal, having the edge which is directed toward the direction of rotation of the rotor-unit i. e. its leading edge, indicated at 12a and 13a, disposed a greater radial distance from the axis of rotation, here represented by the shaft 10, than is the radial distance of the edge of the plate which trails during the rotation i. e. the trailing edge, indicated at 12b and 13b, from the same axis of rotation. At least the major portion of the inner surface of the plate slopes from the trailing edge to the leading edge, but at no point is it a less radial distance from the axis of rotation than is the trailing edge.

Preferably, as illustrated, see Fig. 1, the end plates 14 and 15 are elliptical, and the scoop members 12 and 13 are curved concavely with respect to the axis of rotation in approximately the form of mutually diagonally opposite quarter-segments of the ellipse of the respective end plates.

Desirably the end plates 14 and 15 are spaced apart mutually on a quill shaft 16, the latter being removably, but rigidly, mounted on the shaft 10. The shaft 10 is so disposed, horizontally, relative to the maintained body of liquid 11 that upon rotation of the rotor-unit in the direction of the arrow, Fig. 1, leading edges 12a and 13a of the scoop members 12 and 13, respectively, dip alternately below the surface of the body of liquid 11 and scoop up a quantity of the liquid at each revolution of the rotor-unit.

The leading edges 12a and 13a are desirably serrated in substantially saw-tooth formation, see Fig. 2, for a purpose to be hereinafter made clear.

The quantity of liquid scooped up by each scoop member as it revolves about its axis, due to the effect of inertia moves upwardly at less velocity than does the particular scoop member concerned. Consequently, the quantity of liquid travels downwardly along the curved inner surface of the respective scoop member toward the trailing edge 12b or 13b as the case may be.

Because of the differential between the radial distance of the leading edge, 12a or 13a, from the axis of rotation, here designated as R, and the radial distance of the trailing edge, 12b or 13b, from the same axis of rotation, here designated as r, centrifugal force acting upon the quantity of liquid causes reversal of its direction of travel before reaching the trailing edge, and directs its travel upwardly along the inner surface of the scoop member for forcible discharge over the leading edge, 12a or 13a, substantially radially of the axis of rotation. The serrations of the leading edges effect dissemination of the quantity of liquid in the form of a fine spray as it discharges from the rotor-unit.

The length of the individual scoop members must be such that for a given speed of rotation of the rotor-unit, curvature configuration of scoop member plate, disposition of scoop member plate relative to the axis of rotation, and depth of bite in the maintained body of liquid, the quantity of liquid scooped up will have its direction of travel reversed before reaching the trailing edge of the plate.

For any given embodiment, the speed of rotation of the rotor-unit, the configuration of scoop member, the disposition of the scoop member relative to the axis of rotation, and the depth of bite of the rotor-unit under the surface of the maintained body of liquid may be adjusted relative to one another to produce desired specific spray effects. Considerable variation in the stated variable factors may be had in adapting the present invention to commercial practice.

Best results are had when the radial distance $r$ is approximately $\tfrac{2}{3}$ the radial distance R. Variation in the speed of rotation of the rotor-unit effects the direction of discharge of, and the degree of fineness of the spray.

Referring now to Figs. 3, 4, 5 and 6, which illustrate a complex form of the invention, a shaft 20 is mounted substantially horizontally for rotation in suitable disposition with respect to the maintained body of liquid 21. Rigidly mounted on the shaft 20 is a preferred embodiment of the complex form of rotor-unit.

End plates of any suitable configuration, as at 22 and 23, are spaced apart on and rigidly secured to quill shaft 24, which in turn is removably, but rigidly mounted on the shaft 20 for rotation therewith.

Rigidly mounted between the end plates 22 and 23 are scoop members comprising, respectively, blades 25 and 26 disposed in mutual diagonal opposition on respective sides of shaft 20. The blades 25 and 26 are desirably configured and disposed with respect to the rotative axis, represented by shaft 20, in generically the same manner as are the corresponding blades 12 and 13, Figs. 1 and 2, that is to say, each sloping from its leading edge to its trailing edge and having its leading edge open-spaced farther from the axis of rotation than is its trailing edge open-spaced from the same axis of rotation. The lengths of the respective blades, however, are such that the quantity of liquid scooped thereby from the maintained body of liquid 21, is discharged over their trailing edges, indicated at 25b and 26b, respectively.

The scoop members further comprise, respectively, auxiliary blades 27 and 28 disposed, respectively, adjacent the trailing edges 25b and 26b. Each of the auxiliary blades has a leading edge, as at 27a and 28a, respectively, directed toward the direction of rotation of the rotor-unit. The trailing portion of each, indicated at 27b and 28b respectively, is preferably pocket shaped, as illustrated, and opens adjacent the particular trailing edge, 25b and 26b respectively, of the respective blades 25 and 26. The leading edges 27a and 28a are desirably serrated in substantial saw-tooth formation.

As the rotor-unit rotates with the shaft 20, the leading edges 25a and 26a of the scoop members 25 and 26, respectively, dip below the surface of the maintained body of liquid, alternately, during each revolution, thereby scooping up a quantity of liquid, see the particular quantity indicated at A, Figs. 3 and 4. The quantities of liquid travel downwardly along the curved inner surfaces of the respective blades, and are discharged over the trailing edges thereof into the pocket forms 27b and 28b, respectively, of the auxiliary blades 27 and 28, respectively, as is illustrated at A, Fig. 5.

Due to centrifugal force acting thereon, the quantities of liquid travel outwardly toward the leading edges, 27a and 28a, respectively, of the auxiliary blades, and are discharged over the leading edges thereof substantially radially of the axis of rotation, see B, Figs. 3, 4 and 5. Because of the serrated leading edges, as previously explained, the quantities of liquid will be disseminated in the form of fine spray.

As in the case of the previously described type of rotor-unit, the configuration of the main blades and of the auxiliary blades and their relative placement with respect to the axis of rotation, the speed of rotation of the rotor-unit, and the depth of bite of the main blades under the surface of the maintained body of liquid may be varied to attain any desired specific result.

The provision of auxiliary blade surfaces in the present complex form of rotor-unit eliminates possibility of turbulence of the liquid on the inner surface of the scoop member and consequent increased power necessary to actuate the rotor-unit.

Whereas this invention has been described with respect to certain preferred forms thereof, it is to be definitely understood that many variations may be made therein without departing from the spirit of the invention as generalized in the following claims.

I claim:

1. A rotor-unit for spraying liquids, comprising at least one scoop member rigidly mounted with respect to an axis of rotation, and having its scoop surface facing said axis and wholly spaced apart therefrom to provide an open passage between said scoop surface and said axis, said scoop member comprising a blade having a leading edge open-spaced farther from the said axis than is the trailing edge open spaced from the same axis, the inner surface of said blade member sloping from the trailing edge to the leading edge, and at no point being disposed a less radial distance from the said axis than is the said trailing edge, the length of blade, its configuration, and its disposition with respect to the axis of rotation being such that, for a given depth of bite into the maintained body of liquid, and at a given speed of rotation, the liquid picked up by the said leading edge will have its direction of movement reversed, as it travels along said blade and will be discharged from said leading edge.

2. A rotor-unit for spraying liquids, comprising shaft means, a frame structure rigidly mounted on said shaft means for rotation therewith, at least one scoop member rigidly mounted in said frame structure, and having its scoop surface facing said shaft means and wholly spaced apart therefrom to provide an open passage between said scoop surface and said shaft means, said scoop member comprising a blade configurated, and disposed relative to the said shaft means, such that the portion of the blade which leads during rotation of the rotor-unit is open-spaced a greater radial distance from the said shaft means than is the portion of the blade which trails open-spaced from said shaft means and, further, such that the intermediate portion of the inner surface of the blade is open-spaced from the said shaft means, slopes from the leading portion to the trailing portion, and is at no point a less radial distance from the said shaft means, than is the trailing portion of the blade, the length of blade, its configuration, and its disposition with respect to the axis of rotation being such that, for a given depth of bite into the maintained body of liquid, and at a given speed of rotation, the liquid picked up by the said leading edge will have its direction of movement reversed, as it travels along said blade and will be discharged from said leading edge.

3. A rotor-unit for spraying liquids, comprising end plates aligned in spacial relation on shaft means, and two scoop members rigidly secured to and between said end plates in mutual diagonal opposition on respective sides of said shaft means, said scoop members each comprising a blade directed toward the direction of rotation of the rotor unit and having its leading edge open-spaced farther from the shaft means than is its trailing edge open-spaced therefrom, the scoop surfaces of said scoop members facing said shaft means, being open-spaced therefrom, sloping from their respective trailing edges to their respective leading edges, and at no point being disposed a less radial distance from the said shaft means than are their respective trailing edges, the length of blade, its configuration, and its disposition with respect to the axis of rotation being such that, for a given depth of bite into the maintained body of liquid, and at a given speed of rotation, the liquid picked up by the said leading edge will have its direction of movement reversed, as it travels along said blade and will be discharged from said leading edge.

4. A rotor-unit for spraying liquids, comprising blade means disposed, respectively, on opposite sides of a central axis, said blade means having approximately the same curvature, and being disposed with respect to each other and to the said central axis in approximately the same manner that diagonally related mutually opposed approximate quarter-segments of the periphery of an ellipse, which lie approximately between the major and minor axes of the ellipse, are curved and disposed relative to each other and to the center of the ellipse, said blade means being open-spaced from the said central axis.

5. A rotor-unit for spraying liquids, comprising shaft means, a frame structure rigidly mounted on said shaft means for rotation therewith, at least one scoop member rigidly mounted in said frame structure, and having its scoop surface facing said shaft means and wholly spaced apart therefrom to provide an open passage between said scoop surface and said shaft means, said scoop member comprising a blade configurated and disposed relative to the said shaft means such that the portion of the blade which leads during rotation of the rotor-unit is a greater radial distance from the said shaft means than is the portion of the blade which trails, and further, such that the intermediate portion of the inner surface of the blade is open-spaced from the said shaft means, slopes from the leading portion to the trailing portion, and is at no point a less radial distance from the said shaft means, than is the trailing portion of the blade, the length of said blade, its configuration, and its disposition with respect to the axis of rotation being such that, for a given depth of bite of the said blade into a maintained body of liquid and at a given speed of rotation of the rotor-unit, the quantity of liquid scooped up by the blade will be discharged over the trailing edge of the blade; an auxiliary blade rigidly secured adjacent the trailing edge of said blade and adapted to receive the quantity of liquid discharged from said trailing edge, said auxiliary blade having a leading edge directed toward the direction of rotation of the rotor-unit, said auxiliary blade being of such length, of such configuration, and of such disposition with respect to the axis of rotation that said received quantity of liquid will discharge over the leading edge thereof.

6. A rotor-unit for spraying liquids, comprising shaft means, a frame structure rigidly mounted on said shaft means for rotation therewith, at least one scoop member rigidly mounted in said frame structure, and having its scoop surface facing said shaft means and wholly spaced apart therefrom to provide an open passage between said scoop surface and said shaft means, said scoop member comprising a blade configurated and disposed relative to the said shaft means such that the portion of the blade which leads during rotation of the rotor-unit is a greater radial distance from the said shaft means than is the portion of the blade which trails, and further, such that the intermediate portion of the inner surface of the plate is open-spaced from the said shaft means, slopes from the leading portion to the trailing portion, and is at no point a less radial distance from the said shaft means, than is the trailing portion of the blade, the length of said plate, its configuration, and its disposition with respect to the axis of rotation being such that for a given depth of bite of the said blade into a maintained body of liquid and at a given speed of rotation of the rotor-unit, the quantity of liquid scooped up by the blade will be discharged over the trailing edge of the blade; an auxiliary blade rigidly secured adjacent the trailing edge of said blade and adapted to receive the quantity of liquid discharged from said trailing edge, said auxiliary blade having a leading edge directed toward the direction of rotation of the rotor-unit, and having a trailing portion of pocket formation opening adjacent the trailing edge of said blade and adapted to receive the quantity of liquid discharged therefrom, said auxiliary blade being of such length, of such configuration, and of such disposition relative to the axis of rotation that said received quantity of liquid will discharge over the leading edge thereof.

7. A rotor-unit for spraying liquids, comprising shaft means, a frame structure rigidly mounted on said shaft means for rotation therewith, at least one scoop member rigidly mounted in said frame structure, and having its scoop surface facing said shaft means and wholly spaced apart therefrom to provide an open passage between said scoop surface and said shaft means, said scoop member comprising a blade configurated and disposed relative to the said shaft means such that the portion of the blade which leads during rotation of the rotor-unit is a radial distance from the said shaft means approximately ⅔ that of the portion of the blade which trails, and, further, such that the intermediate portion of the inner surface of the blade is open-spaced from the said shaft means, slopes from the leading portion to the trailing portion, and is at no point a less radial distance from the said shaft means than is the trailing portion of the blade, the length of blade, its configuration, and its disposition with respect to the axis of rotation being such that, for a given depth of bite into the maintained body of liquid, and at a given speed of rotation, the liquid picked up by the said leading edge will have its direction of movement reversed, as it travels along said blade and will be discharged from said leading edge.

8. A rotor-unit for spraying liquid comprising a scoop member mounted for rotation around an axis, said scoop member having a leading portion open-spaced from said axis and a trailing portion open-spaced from said axis a lesser distance than is the said leading portion, the inner surface of said scoop member being open-spaced from said axis to provide an open passage therebetween decreasing substantially progressively in cross-section from the said leading portion to the said trailing portion of said scoop member, the length of said scoop member, its configuration, and its disposition with respect to said axis of rotation being such that, for a given depth of bite of said scoop member into a maintained body of liquid and at a given speed of rotation of said rotor-unit, the liquid picked up by the said leading portion will have its direction of movement reversed as it travels along said scoop member and will be discharged from said leading portion.

9. A rotor-unit as recited in claim 8 wherein the leading edge of said scoop member is serrated.

10. A rotor-unit as recited in claim 5 wherein the leading edge of the auxiliary blade is serrated.

11. A rotor-unit for spraying liquids comprising at least one scoop means rigidly mounted with respect to an axis of rotation and having the scoop surface facing said axis and wholly spaced apart therefrom to provide an open passage between the scoop surface and said axis, the leading portion of said scoop means being open-spaced farther from said axis than is the trailing portion of said scoop means open-spaced from the same axis, and the scoop surface of said scoop means sloping from the trailing portion to the leading portion outwardly away from the said axis, the length of said scoop means, its configuration, and its disposition with respect to said axis of rotation being such that, for a given depth of bite of the said scoop means into a maintained body of liquid and at a given speed of rotation of said rotor-unit, liquid picked up by the said leading portion will have its direction of movement reversed as it travels and will be discharged from said leading portion.

12. A rotor-unit for spraying liquids, comprising a scoop member mounted with respect to an axis of rotation, said scoop member having approximately the curvature and length of that quarter-section of the circumference of an ellipse which lies approximately between the major and minor axes of said ellipse, said axis of rotation coinciding in position, relative to said scoop member, with the center of said ellipse, and said scoop member being open-spaced from said axis of rotation.

13. A rotor-unit for spraying liquids, comprising shaft means, end plates of similar approximate ellipse formation spaced apart and substantially similarly mounted on said shaft means with the centers thereof coinciding with the center of the shaft means, two scoop members, each having approximately the curvature and length of that quarter-section of the circumference of the ellipse of the end plates which lie approximately between the major and minor axes of said ellipse, said shaft means coinciding in position, relative to said scoop members, with the center of said ellipse, and said scoop members being rigidly mounted between said end plates adjacent to and substantially coincident with the curvature of the peripheral edges thereof, in mutually diagonal opposition, around said shaft means, the said scoop members being open-spaced from the said shaft means.

HERBERT ALFRED FABER.